United States Patent

[11] 3,633,275

[72] Inventor: Elmer R. Hutchinson
North Hollywood, Calif.
[21] Appl. No.: 838,821
[22] Filed: July 3, 1969
[45] Patented: Jan. 11, 1972
[73] Assignee: Elmer Dudek
Costa Mesa, Calif.
a part interest

[54] CONDUIT SAW
4 Claims, 8 Drawing Figs.

[52] U.S. Cl. ........................... 30/90.3, 30/167, 83/506
[51] Int. Cl. ........................... B23d 47/08
[50] Field of Search ........................... 30/90.3, 90.4, 92.5, 167; 83/12, 506, 924

[56] References Cited
UNITED STATES PATENTS
2,502,656  4/1950  Koett ........................... 30/90.3 X
3,271,838  9/1966  Pisani ........................... 29/2.16
3,371,415  3/1968  Hutchinson ........................... 30/90.3
3,453,917  7/1969  Perry ........................... 83/924 X Primary Examiner—Andrew R. Juhasz
Assistant Examiner—Michael Koczo, Jr.
Attorney—Noel G. Conway ABSTRACT: A device for cutting conduit having a pair of jaws having opposed recesses to form an elongated opening to receive the conduit and which jaws are hinged along one side thereof along one side of said opening; said device having hinged thereto a saw blade holder carrying a saw blade for movement between a position where said saw blade is not in said opening and a second position where said saw blade is well within said opening; said saw blade holder having a spring resiliently urging one end of said holder so as to resiliently urge said saw blade into any conduit in the device when the jaws are closed; said device having provision to removably receive rotary power from a common portable drill motor held by the operator.

PATENTED JAN 11 1972
3,633,275
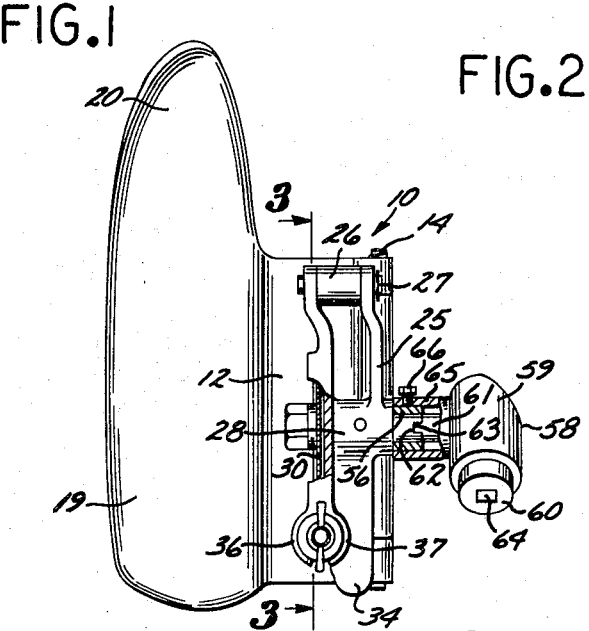
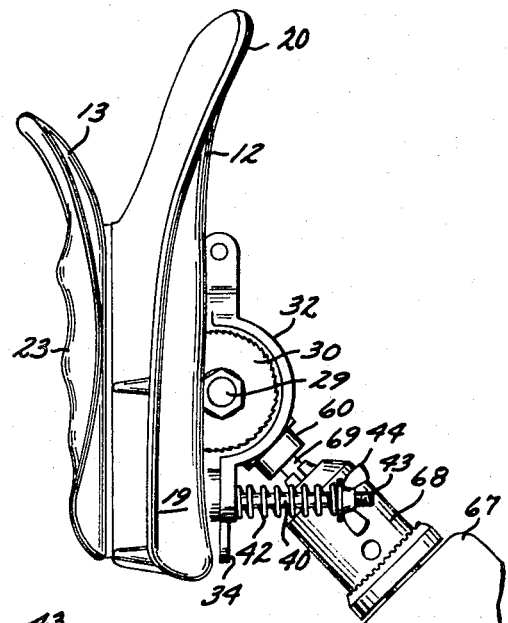
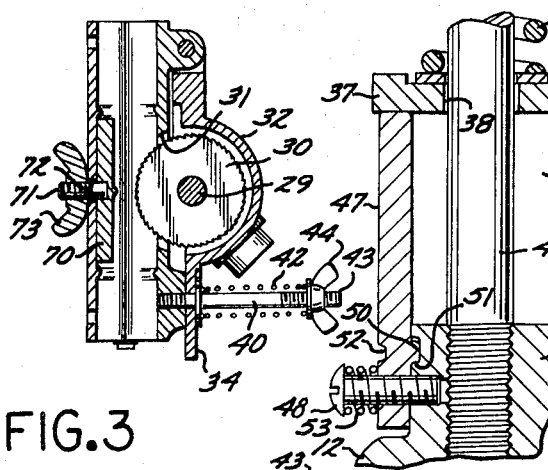
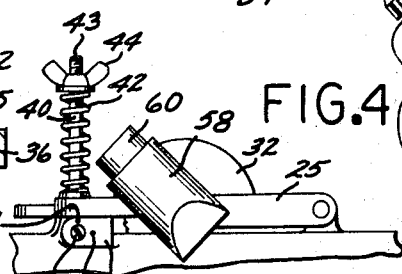
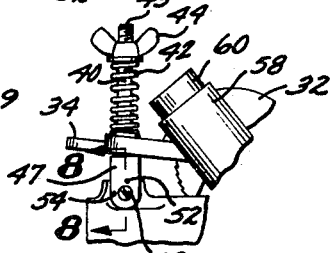
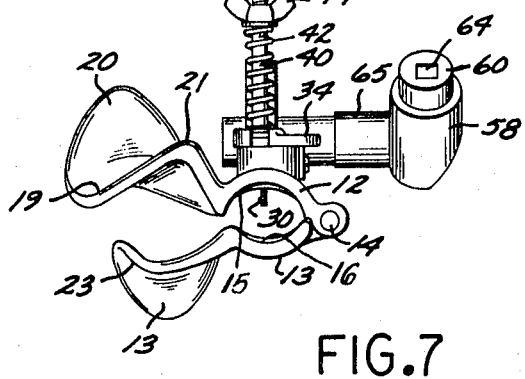
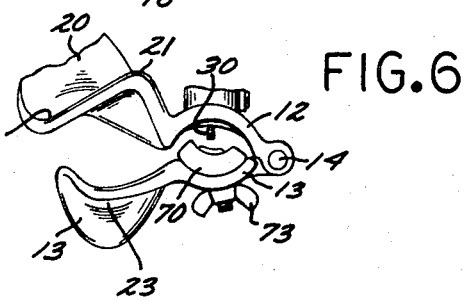
INVENTOR.
ELMER R. HUTCHINSON
BY Noel G. Conway
ATTORNEY

CONDUIT SAW

This invention relates to electrical conduit saws, and more particularly to such saws which have provision for automatically advancing the saw into the conduit to be cut.

Embodiments of the present invention are principally used to cut helically wound metal conduit from around electrical conductors, sometimes called armored cable. On such case, a saw blade is used to cut through the conduit in a direction parallel to the axis of the conduit. However, since the conduit is made of a helically wound metal strip, the conduit can be separated by making such longitudinal cut for a length slightly in excess of the width of the metal strip.

Saws for cutting conduit have been provided in the past. For example, the conduit saw disclosed in U.S. Pat. No. 3,371,415 by this same inventor accomplishes such results. However, it has been found that increased efficiency can be provided by shaping differently the handle portion by which the operator holds the jaws of the saw. And further, it has been found that less skillful operators can use the saw if the saw is resiliently based into the work.

Another aspect of the present invention is that embodiments thereof are suitable to be power driven by a common drill motor. This will speed up the cutting process, and reduce any fatigue of the operator, and yet the manufacturing cost remains low.

Another aspect of the present invention is the manner in which it provides a simply constructed, rugged saw which has the capability of handling different sized conduit and different requirements as to depth of cut.

Another aspect of the present invention is that embodiments thereof can include a longitudinal ridge on the jaw to be engaged by the operators thumb, which ridge is positioned to be received in the notch of the operator's hand between the main thumb muscle and the operator's palm.

With the foregoing in mind, it is a major object of this invention to provide an improved conduit saw.

Another object of this invention is to provide a conduit saw which is capable of receiving rotary power from a common drill motor.

Another object of this invention is to provide a lightweight, rugged conduit saw which may be economically manufactured and maintained.

A further object of this invention is to provide a lightweight compact conduit saw which may be easily used by relatively inexperienced persons.

A still further object of this invention is to provide a conduit saw which has a capability of accommodating different sized conduits, and different requirements as to depth of cut.

Still another object of this invention is to provide a conduit saw having specially formed jaws with handle portions thereto which are particularly well suited to easing the task of holding the conduit stationary while the sawing operation is in process.

Other and further objects of this invention will become apparent in the detailed description below in conjunction with the attached drawings wherein:

FIG. 1 is a top plan view of a first preferred embodiment of the present invention;

FIG. 2 is a side view of the conduct saw shown in FIG. 1 as seen from the left side of the saw;

FIG. 3 is a fragmentary cross-sectional view of the saw taken along line 3—3 in FIG. 1;

FIG. 4 is a fragmentary view of the right side of the saw disclosing the arrangement of the components for allowing the saw blade to advance to its most advanced position;

FIG. 5 is a fragmentary view of the saw as seen from the right side, with the parts in position where the saw blade has been limited in its advancement;

FIG. 6 is a rear fragmentary view of the saw with an insert in the jaws to accommodate smaller sized conduit;

FIG. 7 is a rear view of the saw without any insert to accommodate smaller conduits; and FIG. 8 is an enlarged fragmentary, partial cross-sectional view disclosing the details of the manner in which the advancement of the saw blade is limited.

Referring now to the drawings, there is shown a first preferred embodiment of the present invention, which conduit saw is generally indicated by the arrow 10. The conduit saw, or device 10 includes a first, or upper, jaw 12 and a second, or lower, jaw 13, which are generally disposed in parallel relation and are hinged together along the right side (as seen in FIGS. 1, 6 and 7) by a hinge pin 14. Preferably, these jaws are cast of some lightweight metal such as aluminum or magnesium.

The present conduit saw is particularly adapted for use by individuals who will use their left hand to hole the main portion of the saw stationary while the rotary force is applied with the other hand (either manually or through the use of a drill motor). Further, the device 10 is used with the portion of the device at the top in FIG. 1. Accordingly, the specification, and some of the claims, will use the terms front, rear, left, right, top, bottom, upper, and lower. However, it is to be understood that these terms are used merely for purpose of a frame of reference in describing and claiming the present invention and accordingly, said terms should not be felt to be limitative of the claims except as they are used to correlate the different parts of the device 10 together.

For purposes of holding the conduit, there is provided in the first jaw 12 a recess 15, and a recess 16 in the second jaw 13. As can be seen, these recesses 15 and 16 are in apposition to each other. And, they form a cylindrical opening which is well suited for receiving and grasping the particular conduit to be cut.

On the left hand side of the jaw 12 there is provided a hand heel section 19 which has a curved cross section and is also curved at its forward end away from the jaw 13 to provide a thumb section 20. As best seen in FIGS. 6 and 7, the hand heel section 19 has a longitudinal ridge 21 extending generally parallel to the opening formed by the recesses 15 and 16. This ridge 21 (which projects away from the jaw 13) is disposed so as to be adapted to be received into the palm of the operator's hand between the main muscle of the thumb and the palm of the hand. Thereby, the operator can obtain a more secure grip on the first jaw 12.

In apposition to the hand heel section 19, there is provided on the second jaw 13 a finger section 23. As can be seen in FIG. 2, the lower surface of the finger section 23 is shaped so as to accommodate the individual fingers of the operator. Thereby, the operator is permitted to a more secure grip of the jaw 23.

Just above the recess 15, there is provided a saw blade holder 25 which is hingedly secured to the first jaw 12. To this end, there is provided in the area of recess 15 an upstanding boss 26 at the forward edge of the jaw 12 and a pin 27 serves to complete the hinge joint between the boss 26 and the saw blade holder 25.

Near the middle of the saw blade holder 25, there is provided an enlargement, or boss, 28 extending parallel to the axis about which the saw blade holder swings. Received within this boss 28, there is provided a rotatable shaft 29 which carries fixed thereto a circular saw blade 30. As can be seen, the saw blade 30 rotates in a plane which is parallel to the axis of the opening provided by the recesses 15 and 16. Additionally, the saw blade 30 is disposed at the center of said last mentioned opening.

It is also desired to diminish the chances of the operator being injured by accidentally touching the saw blade 30. Accordingly, there is preferably cast into the saw blade holder 25 a guard, or shield, 32.

In use, it is necessary to manually swing the saw blade holder 25 relative to the jaw 12. To this end, there is provided a handle, or paddle, 34 at the rear end of the saw blade holder 26 opposite the forward end where the saw blade holder is hingedly secured to the boss 26. The use of this handle, or paddle, 34 will be described further below.

Adjacent the handle, or paddle, 34 there is provided an enlargement with a pair of legs 36 and 37 forming a rearwardly facing notch 38. Immediately below said legs 36 and 37, and notch 38, there is provided a boss 39 on the jaw 12. This boss 39 has an upstanding post 40 threaded therein (in the manner best seen in FIG. 8). As can best be seen in FIG. 8, the cross dimension of the notch 38 is only slightly greater than the diameter of the post 40. Accordingly, the post 40 can function to give lateral support to the swinging, i.e., the rear end of the saw blade holder 25.

For purposes of advancing the saw blade 30 into the work, there is provided on the post 40 a compression spring 42. In practice, it has been found that it is desirable to be able to manually adjust the amount of force supplied by the compression spring 42. Therefore, the post 40 is threaded at its upper end as at 43. And, a wing nut 44 is threaded onto said upper end of the post 40. As is obvious, the more that the wing nut 44 is tightened downward, the greater will be the force of the compression spring on the swinging end of the saw blade holder 25. As best seen in FIG. 8, there is provided a washer 45 encircling the post 40 and furnishing a seat against which the compression spring 42 pushes against the legs 36 and 37.

In some cases, it is desirable to cut deeper at other times. In order to provide an easily operated mode of limiting the advancement of the saw blade 30 into the work, the device 10 includes an elongated block 47 which is swingably held to the boss 39 by means of blot 48 which is threaded into said last mentioned boss. As can be seen, the bolt 48 extends through one end of the elongated block 47 and the said block can be turned between the upstanding position shown in FIG. 5 and the horizontal position shown in FIG. 4. In order to releasably lock the elongated block 47 in either one of these two positions, there is provided a shallow hole, or pocket, 50 in the right side of the boss 39. And, in addition, there is provided a detent 51 on the block 47 by means such as swaging the block as at 52. Further, there is provided a compression spring 53 which resiliently urges the block 47 against the boss 39, and a second detent is provided by swaging at 54.

With this arrangement, the elongated block 47 can be moved to either one of the two positions, and, in either one of the two positions, the detent 51 or the unnumbered detent on the block 47 would be received in the shallow hole 50.

It can be seen that, with the arrangement just described, the saw blade holder 25 may swing to move the saw blade 30 between a first, or upper, position where the saw blade is well out of the opening formed by the recesses 15 and 16 and a second position (when the block 47 is in the position shown in FIG. 4) where the saw blade is well into said last-mentioned opening. And, when it is desired to make a lesser cut, the operator need merely grasp the handle, or paddle, 34 and raise it against the compression spring 40 sufficiently so that he can turn by hand the block 47 to the position shown in FIG. 5. As demonstrated in FIG. 5, the block 47 limits the downward movement of the saw blade 30 toward the above mentioned second position.

The present device can be operated with a manual crank handle being placed on the right end of the shaft 29 in order to rotate the saw blade 30. However, the present preferred embodiment has the additional advantage that a very simple attachment adapts the device 10 to be electrically powered by a common drill motor. For this purpose, there is provided an extension 56 on the boss 28. This extension 56 is provided to permit the device 10 to receive a power drive adapter unit 58. The power drive adapter unit 58 includes a housing 59 having a right-angle drive unit (not shown) within it. Therefore, driven shaft 60 can enter the housing 59 at a right angle to the axis of the driving shaft 61. The use of this advantageous relationship will be described further below.

In order to simplify the transmission of rotational forces from the driving shaft 61, there is provided on said last-mentioned driving shaft a male portion 62, while there is a complimentary female cavity 63 on the right hand end of the shaft 29.

As one preferred manner of holding the power drive adapter unit 58 to the device 10, the adapter unit is provided with a sleeve 65 of the proper size to be received in close sliding fit over the boss extension 56. Thereby, after the sleeve 65 has been positioned, a setscrew 66 will fix the power drive adapter unit to the main portion of the device. Additionally, for purposes of receiving rotary driving force, there is provided a female cavity 64 in the end of the driven shaft 60 closest to the operator.

With the arrangement just described, it is simple to use a drill motor, such as drill motor 67 (see FIG. 2) to power the saw. In order to communicate the rotary power from the drill motor 67 to the driven shaft 60, one need merely "chuck" into Jacobs chuck 68 a square bit 69. This square bit 69 is received into the above-mentioned square female cavity 64 of the driven shaft 60.

With this arrangement, it should be noted that the assembly has the advantage that a common drill motor can be used. And, since there are fewer parts involved, the cost of manufacture is lower than other electrically powered cutting saws. Further, it can be seen how the drill motor 67 can be removed at any time. This will facilitate the handling of the device 10.

As previously mentioned, it is desired that the saw be able to accommodate several sizes of conduit. Therefore, there is provided a spacer 70 secured in the opening formed by the recesses 15 and 16. This is used when it is desired to cut smaller sized armored cables.

It will be noted that the spacer 70 can be easily inserted and then removed. To this end, the spacer 70 has a threaded shaft 71 which extends through a hole 72 provided in the recess 16. Then, through the use of a wing nut 73, the spacer 70 may be removably secured in the operative position shown.

While only a few embodiments of the present invention have been shown and described in detail, it will be apparent to those skilled in the art that such is by way of illustration only and numerous changes may be made thereto without departing from the spirit of the present invention:

I claim:

1. A device for sawing conduit comprising in combination:
   jaw means including a first and a second jaw in apposition forming an elongated opening therebetween adapted to receive a conduit to be cut;
   a circular conduit saw blade;
   means comprising a saw blade holder upon which said saw blade is mounted for rotation about a predetermined axis of rotation, said holder being connected to said device for movement between a first position where said saw blade does not extend into said elongated opening and a second position where the saw blade extends into said elongated opening and into any conduit in said elongated opening;
   stop means on said device for selectively limiting the extent that said saw blade can move toward said second position, said stop means comprising:
   an elongated block mounted on said device for movement between a first position where the block is not engaged by said blade holder until said holder is in said second position and a second position where said saw blade holder engages the block before said saw blade holder reaches said second position of the blade holder in the travel of the holder from the first position to the second position.

2. A device for sawing electrical conduit comprising in combination:
   jaw means including a first and a second jaw in apposition forming an elongated opening therebetween adapted to receive a conduit to be cut;
   a circular conduit saw blade;
   means comprising a saw blade holder upon which said saw blade is mounted for rotation about a predetermined axis of rotation, said holder being hingedly connected to said first jaw for movement between a first position where said saw blade does not extend into said elongated opening and a second position where said saw blade extends into said elongated opening in any conduit in said elongated opening, said saw blade hold having a notch at a point spaced away from the point at which the holder is hinged to the first jaw;

advancing means connected to said first jaw for resiliently urging saw blade holder and said saw blade from said first position toward said second position, said advancing means including:
- a post fixed to said first jaw and extending through said notch as said holder is moved between said first and said second positions, said notch having a cross dimension only slightly greater than said post in order that said post will stabilize said holder;
- a compression spring operatively connected to said post and engaging said holder at a first end of the spring and urging said holder toward said second position.

3. The device set forth in claim 2 including: abutment means on said post engaging said spring at its end opposite said first end, said abutment means being adjustable on said post to vary the amount of force said advancing means puts on said saw blade.

4. a device for sawing electrical conduit comprising in combination:
- a first jaw and a second jaw disposed in a generally horizontal position;
- hinge means along a right edge of the jaws swingably connecting them together;
- said first and second jaws each having a centrally disposed recess extending parallel to said hinge means from a rear edge of each jaw to a front edge of each jaw to form an elongated opening having an axis extending generally parallel to said hinge means, said opening being adapted to receive therein a conduit to be clamped by said jaws when said jaws are clamped together;
- means for clamping said jaws together comprising:
  - a hand heel section fixed to said first jaw and extending from the left side of said recess, said hand heel section has a longitudinal ridge projecting away from said finger section at a point to be received into the notch of a person's hand formed at the joinder of the main muscle of the thumb and the palm of the hand; and
  - a finger section fixed to said second jaw and extending from the left side of said recess;
- a circular conduit saw blade
- means comprising a saw blade holder hingedly connected to said first jaw for movement between a first position where said saw blade does not extend into said elongated opening and a second position where said saw blade extends well into said elongated opening and into any conduit held in said jaw;
- advancing means connected to said first jaw for resiliently urging said saw blade holder and saw blade from said first position toward said second position;
- and means for rotating said saw blade.

* * * * *